UNITED STATES PATENT OFFICE.

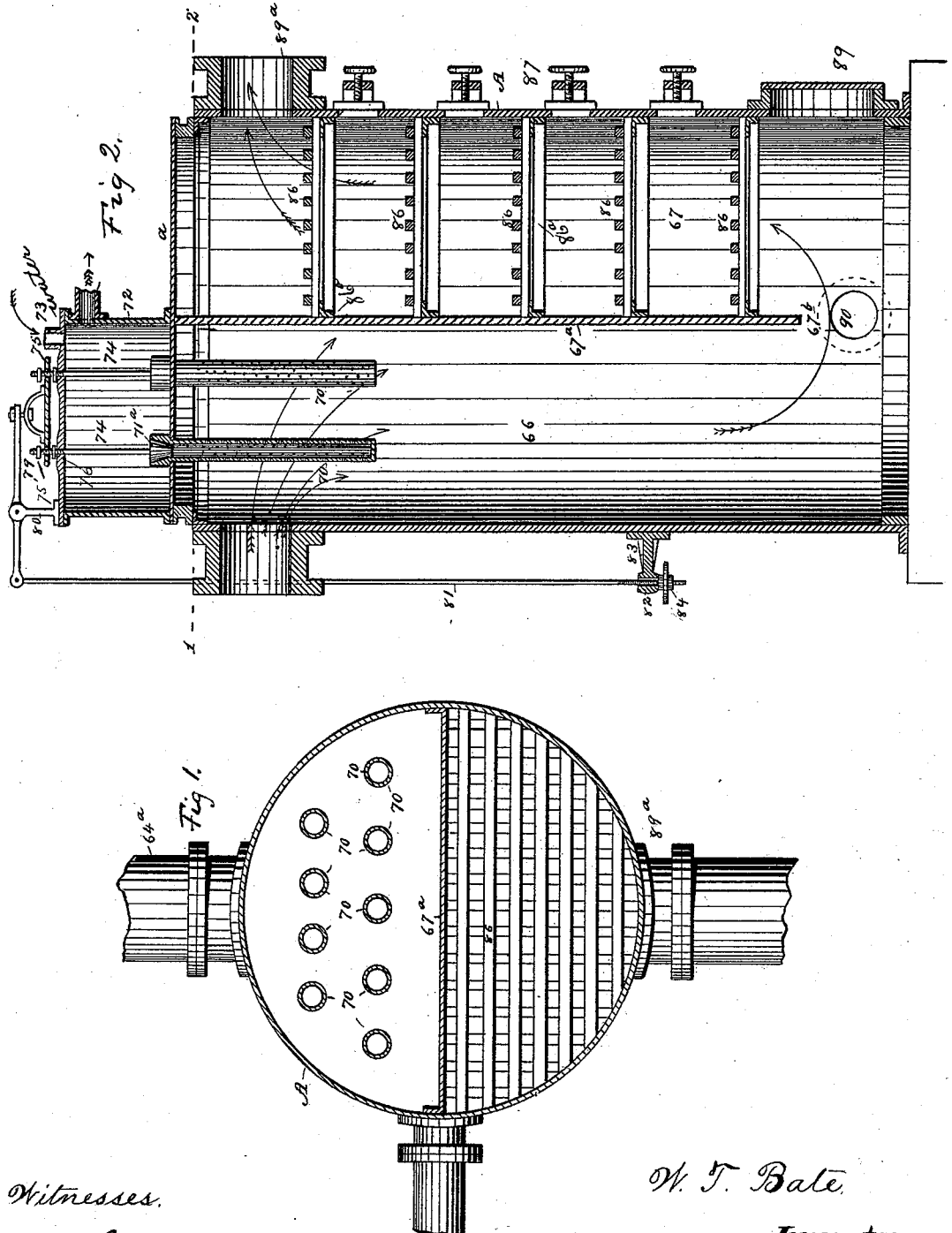

WILLIAM T. BATE, OF CONSHOHOCKEN, PENNSYLVANIA.

GAS SCRUBBER AND PURIFIER.

SPECIFICATION forming part of Letters Patent No. 499,156, dated June 6, 1893.

Application filed October 20, 1891. Serial No. 409,254. (No model.)

*To all whom it may concern:*

Be it known that I, WILLIAM T. BATE, a citizen of the United States, residing at Conshohocken, in the county of Montgomery and State of Pennsylvania, have invented certain new and useful Improvements in Gas Scrubbers and Purifiers, of which the following is a full and complete description, sufficient to enable others skilled in the art to which it appertains to understand and use the same.

In the manufacture of gas, the final operation, after the gas has been "fixed" and "washed" consists in purifying it by eliminating any remains of tarry matter, nitrogen or ammonia, or other deleterious substances and impurities, and my invention comprises an apparatus for performing this final operation, which is called scrubbing and purifying.

The scrubber and purifier which forms the subject of this application forms a part of a gas-producing apparatus or "plant" described in an application for Letters Patent filed by me on the 25th day of May, 1891, and designated in the United States Patent Office by Serial No. 394,040, which is designed for the manufacture of heating gas from bituminous coal, but which is adapted also to the manufacture of illuminating gas.

Illuminating gas requires more scrubbing and purifying than heating gas and my object is to produce a scrubber adapted to either purpose in which the scrubbing and purifying operation may be carried on to any extent necessary or desirable according to the kind of gas to be produced, or the purpose for which it is to be used.

In the accompanying drawings which illustrate my invention and form a part of this specification, Figure 1 represents a central vertical section, and Fig. 2 a horizontal section on the plane indicated by the broken line, 1, 2, in Fig. 1.

A designates the body of the structure made preferably of sheet metal in the form of an upright cylinder, though the form may be varied without departing from the spirit of the invention. The cylinder is closed at top and bottom and is divided into two semi-cylindrical compartments by a vertical partition, $67^a$, which extends from the top downward to within a short distance of the bottom leaving a communicating passage $67^b$ at that point between the two compartments through which the gas passes from one to the other.

$64^a$ is the inlet pipe near the top of the scrubber, through which the gas enters the compartment, 66, which is the scrubber proper, and $89^a$, is the outlet pipe, near the top of the compartment, 67, which is the purifying chamber, and from which the gas passes to the gas holder (not shown) or to the distributing pipes or mains.

*a* designates the top of the scrubber and purifier in which are fixed a series of vertical tubes, 70, which project down into the scrubbing compartment, 66, past the mouth of the inlet pipe, $64^a$ and are thickly perforated below the top *a*. Their upper ends project above the top, *a*, and are formed with valve seats for the reception of conical valves, $71^a$. Upon the top, *a*, over and around the tubes, 70, is a water chamber, 72, which is connected with any suitable water-supply (not shown) by a pipe, 73, through which water enters said chamber at the top with an outlet near the top. The valves, $71^a$, are provided with stems 74 which project up through the top of the water chamber and are connected above the same with a yoke, 75, by which the valves are raised and lowered. The stems project loosely through the yoke and are provided above and below the same with nuts or collars, 75' and 76 separated far enough to permit a limited movement of the valves independently of the yoke. This is a provision to enable the valves to seat themselves independently of each other, so that in the event of any obstruction entering and lodging between any valve and its seat, the other valves of the series will not be prevented from properly seating themselves. The yoke, 75 is connected with the end of a horizontal lever 79, fulcrumed on a standard, 80, which rises from the top of the water chamber, 72. A rod, 81, is connected with the outer end of the lever, 79, which rod extends down along the outside of the scrubber; its lower end is screw-threaded and passes loosely through an eye, 82 on the end of a bracket arm, 83, which projects out from the wall of the scrubber. Below the eye, 82, the rod is provided with a nut, 84, which works against said eye to draw the rod down and open the valves, $71^a$. When the nut is screwed down on the rod the latter is free to rise and the valves seat themselves by gravity or by the pressure of the water in the chamber, 72.

The compartment, 67, is partitioned by a vertical series of horizontal wooden grates, 86, supported by brackets or angle irons, 86ª, secured against the walls of the compartment at approximately equal distances apart. These grates receive and hold a suitable filtering material, such for example, as coke, through which the gas is filtered in its passage toward the outlet, 89ª, and which absorbs and retains any residue of deleterious substances or tarry matters still held in suspension at this stage of the operation.

There should be grates or shelves enough in the apparatus to hold all the coke necessary under any circumstances or conditions to purify the gas to any desirable or necessary extent for the production of the best illuminating gas. In the manufacture of lower grades of gas, where less purification is required, only a part of the grates 86 are charged with coke, the rest being left vacant. Thus the purifying operation is carried to any extent desired by simply placing more or less coke in the purifier. The coke is introduced through openings in the wall of the purifying chamber, which openings are provided with covers or doors, 87 adapted to be tightly closed and secured by ordinary bail fastenings.

At or near the bottom of the structure, is a man-hole provided with a door or cover, 89, also secured by an ordinary bail fastening. This is for the purpose of enabling the apparatus to be cleaned out when necessary.

90 designates an outlet pipe at the bottom of the structure through which the water used in scrubbing together with the accumulated impurities resulting from the scrubbing operation is allowed to flow off and through a submerged pipe in a suitable tank or well.

The operation of the apparatus is as follows:—The gas entering the scrubbing compartment, 66, through the inlet pipe 64ª, passes between, around, and among the depending tubes, 70. The valves, 71ª, being now open, water is admitted into the tubes from the chamber, 72, and passing through the smaller perforations in the tubes, is finely divided and thrown into the scrubber in the form of spray which passing down through the gas absorbs and carries with it any soluble impurities held in suspension. As soon as the compartment, 66, is filled with gas the latter begins to pass through the opening, 67ᵇ, into the compartment, 67, and up through the same, being filtered during its passage toward the outlet, 89ª, through the coke on the grates, 86, whereby any tarry matter and other insoluble impurities are absorbed and retained.

It will be understood from the foregoing that the amount of scrubbing to which the gas is subjected is regulated by the extent to which the valves, 71ª, are opened and that the amount of purification is regulated by the amount of coke or other absorbent material placed upon the grates in the purifying chamber, 67, and that the quality of the gas produced is regulated by the extent to which these operations are carried.

Having now described my invention, I claim—

1. In a gas scrubber, the combination with the scrubbing chamber provided with an inlet at or near the top and with an outlet at or near the bottom thereof, of a series of thickly and finely perforated tubes fixed in the top or cover and depending into the chamber past the inlet opening, a water chamber communicating with said tubes above the chamber, valves for controlling the admission of water into said tubes from the water chamber, said valves being provided with vertical stems, which project above the water chamber, a yoke connected with said valve stems, and a lever for operating said yoke and valves, substantially as shown and described.

2. In a gas-scrubber the combination with the scrubbing chamber of a series of tubes fixed in the top thereof and depending into the chamber, a water chamber above the scrubbing chamber, valves for controlling the admission of water into said tubes from said water chamber, said valves being provided with vertical stems, a yoke connected with said stems in such manner as to permit independent movement of the valves, and a lever for operating said yoke and valves substantially as shown and described.

3. In a gas scrubber and purifier, having scrubbing and purifying chambers separated by a vertical partition and connected with each other at the bottom by a passage through said partition, the combination of the perforated tubes extending into the upper part of the scrubber and terminating below the gas inlet, a water chamber above and valves for controlling the admission of water into said tubes, a series of horizontal grates located in the purifier between the passage through the partition and below the gas outlet of the purifier, and doors opening into the spaces between the grates for charging and removing the purifying material, substantially as specified.

In testimony whereof I affix my signature in the presence of two witnesses.

WILLIAM T. BATE.

Witnesses:
J. H. BROOKE,
CHARLES E. BARBER.